United States Patent

[11] 3,611,191

[72] Inventors Daniel E. Altman;
Myer Geller, both of San Diego, Calif.
[21] Appl. No. 873,323
[22] Filed Nov. 3, 1969
[45] Patented Oct. 5, 1971
[73] Assignee The United States of America as represented by the Secretary of the Navy

[54] SELECTIVELY CONTROLLABLE RADIANT ENERGY DEVICE
11 Claims, 3 Drawing Figs.

[52] U.S. Cl. ................................................ 331/94.5,
313/156, 313/161, 315/111, 315/344, 219/121 L, 219/123
[51] Int. Cl. ....................................................... H01s 3/09, H01j 1/50
[50] Field of Search ........................................... 331/94.5; 313/156 T, 161; 315/111, 344; 219/121 L, 123

[56] References Cited
UNITED STATES PATENTS
3,514,714  5/1970  Angelbeck ................... 331/94.5
OTHER REFERENCES
Fork et al., Broodband Magnetic Field Tuning of Optical Masers" App. Phys. Lett., 2, (9), 1 May 1963 pp. 180– 181

Ahmed et al., " Gas Lasers in Magnetic Fields," Proc. IEEE 52, (11), Nov., 1964 pp. 1356– 1357.
Egorov et al., " Some....He-Ne Pulse Discharge..." Optics & Spectroscopy, XVii, (4), April 1965, pp. 405– 406.
Boss et al., " Broodband Light Amplification in Organic Dyes," App. Phys. Lett., 11, (3), 1 Aug. 67, pp. 89– 91.

*Primary Examiner*—Ronald L. Wibert
*Assistant Examiner*—R. J. Webster
*Attorneys*—J. C. Warfield, Jr., George J. Rubens and John W. McLaren ABSTRACT: A gaseous discharge device is connected to a suitable source of electrical energy which may typically be of the pulsed DC type to generate the emission of radiant energy having a determinable spectral character. A magnetic field is caused to perpendicularly intercept the electric field resultant from the flow of current through the gaseous discharge device causing a controllable and predictable change in the spectral character of the emitted radiant energy in accordance with the strength of the magnetic field. By increasing the strength of the magnetic field, two or more peaks of radiant energy of different spectral character may be generated so that peak emitted power may be realized within a desired spectral region to be employed as the excitation energy for a laser, for example.

PATENTED OCT 5 1971 3,611,191
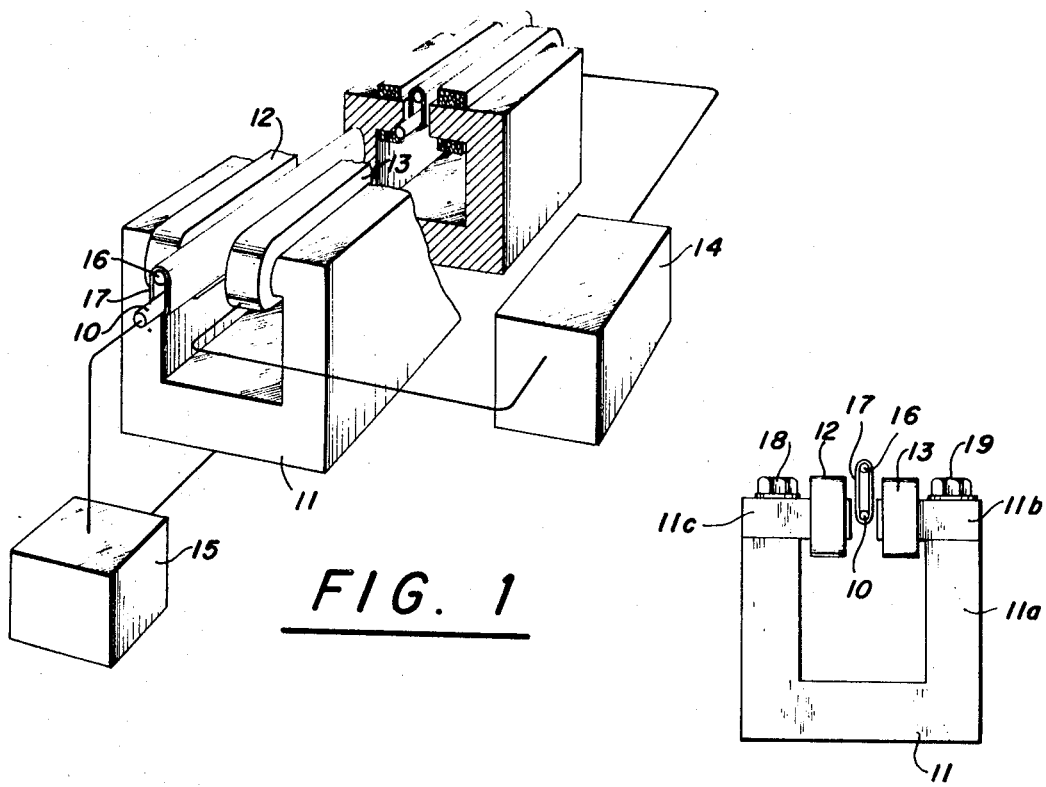
FIG. 1
FIG. 2
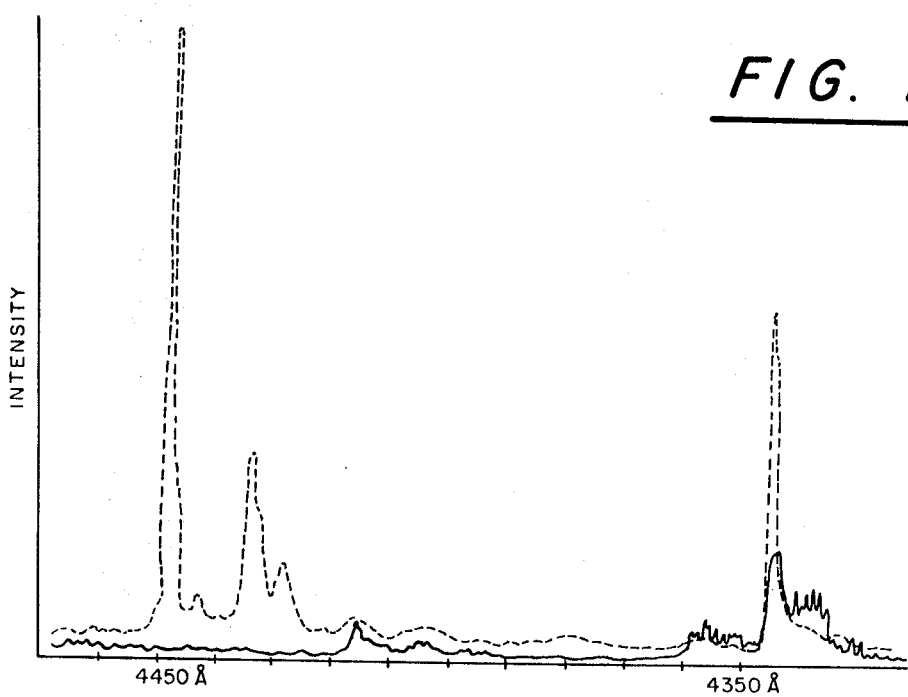
FIG. 3
INVENTOR.
DANIEL E. ALTMAN
BY MYER GELLER
ATTORNEYS

SELECTIVELY CONTROLLABLE RADIANT ENERGY DEVICE

BACKGROUND OF THE INVENTION

Numerous sources of excitation energy are employed in the laser arts, for example, and many different kinds of gaseous discharge devices have been used. Customarily, different gases will produce peak power outputs of radiant energy at different spectral bandwidths in accordance with the gas selected. If a gas is selected which produces a peak power output of radiant energy within the spectral bandwidth which may be usually employed to excite a particular laser material to lasing level, an acceptable degree of efficiency of power transfer may be realized by matching the selected gaseous discharge device for use with that particular laser material.

However, in typical work with lasers and laser materials it has been found that each different laser material will require peak power at a different spectral bandwidth which is characteristic of that particular laser material. Accordingly, it is customary that one particular excitation source is selected from many different possible sources of excitation energy to be employed with each different laser material in an effort to effect a most efficient power transfer from the excitation source to the lasing material. Generally, this is so because of the fact that it is relatively most difficult to control the radiation spectrum emitted by excitation sources such as gaseous discharge devices.

It is possible to change the constituent gas within the gaseous discharge device, to change its pressure, or to even change the geometry of the electrodes employed and the configuration of the discharge vessel; it is also possible to change the amount of electrical current flowing through the gaseous discharge device in order to effect some control over the radiation spectrum emitted by the gas. However, all of these means of exercising a limited degree of control over the radiation spectrum of the energy emitted by the gas are relatively difficult, cumbersome, time consuming, and involve a comparatively major operation on one or more parameters of the gaseous discharge device itself.

Moreover, when a change has been completed, such as altering the constituent gas, its pressure, the geometry of the electrodes, or the discharge vessel, or variably controlling the electrical current through the gaseous discharge device, the changed or modified radiation spectrum which will then be emitted by the gaseous discharge device is not readily changeable to the original radiation spectrum. In other words, such limited modifications and controls as may be effected by altering one of the parameters, geometries, or constituents as mentioned hereinbefore is in the nature of a permanent change which does not readily adapt itself to being returned to its original or another alternative mode of operation. The nature of such change requires a concomitant change back to its original condition in order to return the gaseous discharge device to a mode of operation which will produce its ordinal output, if that should be desired. Accordingly, there exists a need for a source of radiant energy which can be controllably changed to generate peak power radiant energy of a different spectral character within a bandwidth of interest and yet be readily returned to its normal emission of radiant energy of a predetermined spectral character without further alteration of the physical character or principal parameters of the device.

SUMMARY OF THE INVENTION

The present invention contemplates the generation of radiant energy of several controllably different spectral emissions. In its most fundamental form the present invention may comprise a gaseous discharge device such as Xenon lamp or other suitable gas discharge flash lamp which is connected to a source of electrical energy for producing a flow of current through the gas in order to generate the emission of radiant energy when raised to an appropriate energy level. Typically, many such gaseous discharge devices may be energized by pulsed direct current which develops a pulsating flow of current through the gas, causing it to emit radiant energy of a determinable spectral character.

There are many materials available, particularly dye liquids, which would provide excellent possibilities for efficient and powerful lasers if the materials could be sufficiently excited by radiant energy within their absorption bands. Generally, however, the emission spectrum of Xenon gas discharge lamp, for instance, does not overlap the absorption spectrum of such dye liquid material and consequently they cannot be conveniently and efficiently energized to sufficient energy levels to cause them to achieve the lasing phenomenon. The present invention, however, teaches the use of a magnetic field positioned perpendicularly to the direction of the electric field which is resultant from the flow of current in a gaseous discharge device, to thereby controllably change the spectral character of the emitted radiant energy. As a result, a very distinct and marked change is effected in the normal and usual peak radiant energy output of a gaseous discharge device, affording significantly greater latitude in the effort to match the spectral character of the peak power output of the radiant energy emitted by the gaseous discharge device to coincide with the absorption band of the material which it is desired to raise to a lasing energy level.

For example, it has been found that a gaseous discharge device containing nitrogen may have its peak bands of spectral emission significantly changed by the application of an appropriate magnetic field as taught by the concept of the present invention. In the presence of a weak or no magnetic field the nitrogen will be found to emit peak energy at approximately 4,340 A. Upon the application of a magnetic field, however, the same nitrogen gas discharge device will emit peak energies at approximately 4,450 A. and 4,430 A. Thus, the peak energies emitted by the gaseous discharge device have been significantly changed in spectral character so that the same gaseous discharge device may be employed by energize laser materials which absorb in the 4,450 A. to 4,430 A spectral band.

Accordingly, it is a primary object of the present invention to provide a source of radiant energy which may be controllably operated to emit different spectral bands of peak energy.

It is an equally important object of the present invention to provide such a source of controllably different spectral peak energy by the employment of a magnetic field which permits the device to return to its normal spectral character of radiant energy upon removal of the magnetic field.

Another important object of the present invention is to provide a source of radiant energy which may be controllably altered to match the absorption band of a laser material.

Yet another most important object of the present invention is to provide a means by which the radiant energy generated by a laser material may be controllably altered in spectral character.

A further object of the present invention is to provide a means by which the spectral character of emitted radiant energy may be controllably changed to any one of several selectable spectral bands by the change and control of a magnetic field employed as taught by the present invention.

These and other features, objects, and advantages of the present invention will be better appreciated from an understanding of the operative principles of a preferred embodiment as described hereinafter and as illustrated in the accompanying drawings.

BRIEF DESCRIPTION OF THE DRAWINGS

In the drawings:

FIG. 1 is a perspective view of a preferred embodiment of the present invention;

FIG. 2 is an end view of the embodiment illustrated in FIG. 1;

FIG. 3 is a graphical illustration of the spectral change in peak emitted output of radiant energy which can be effected in accordance with the teaching and concept of the present invention.

DESCRIPTION OF THE PREFERRED EMBODIMENT

In FIG. 1 the gaseous discharge device 10, such as a Xenon lamp or a suitable cavity filled with nitrogen, for example, is positioned in the airgap of a substantially U-shaped member of ferromagnetic material 11. In the embodiment of FIG. 1, two coils 12 and 13, respectively, are wound about portions of the ferromagnetic material 11 proximate to the airgap. The coils 12 and 13 may be serially connected to each other and also to a source of electrical energy 14 to cause current to flow through the coils and develop a strong magnetic field in the airgap as a function of the current flow.

Another source of electrical energy 15 is provided to be connected to the gaseous discharge device 10 to cause current to flow therethrough and to generate emission of radiant energy. In the preferred embodiment of the present invention as illustrated in FIG. 1, a laser cell assembly 16 may be positioned close to the radiant energy source 10 so as to receive the emitted power radiated therefrom. It may be desirable to enclose both the source of radiant energy, in the form of a gaseous discharge device 10, and the laser assembly 16 (or a similar device) within a common internally reflective enclosure 17 so that the maximum amount of radiant energy emitted from the gaseous discharge device 10 is caused to impinge upon and be absorbed by the laser or similar device 16.

Both the gaseous discharge device 10 and the laser or similar device which it is desired to stimulate with emitted radiation, may be conveniently arranged to be removable and replaceable in the assembly illustrated in FIG. 1. Accordingly, a different laser assembly may be substituted in the position of element 16 as illustrated in FIG. 1 as may be desired to effect efficient absorption of certain spectral peak radiated power emanating from the gaseous discharge device 10. In an analogous manner the gaseous discharge device 10 may be replaced and have substituted therefor a gaseous discharge device of differing operative characteristics to provide a means of generating peak radiant power within certain other spectral bands as may be desired to give effect to optimum spectral matching for the most efficient power transfer as between the radiated energy and the power absorbed by the laser 16, or a similar device.

FIG. 2 is an end view illustrating the disposition of the several elements of the preferred embodiment shown perspectively in FIG. 1. Like elements shown in FIG. 2 have the same numerical designations as in FIG. 1. It will be noted that the gaseous discharge device 10 is clearly disposed at the center of the airgap formed by the substantially U-shaped element 11 of ferromagnetic material. This arrangement is preferred in order that the gaseous discharge device 10 intercept the magnetic field of greatest strength and highest intensity. Element 11 may be formed of a number of pieces of ferromagnetic material as desired and convenient in fabrication. For example, as illustrated by the end view of FIG. 2, a first U-shaped element 11a is supplemented by like elements 11b and 11c disposed on opposite sides of the basic element 11a and secured thereto by appropriate means such as the bolts 18 and 19. It will be noted, as clearly shown in the illustration of FIG. 2, that the laser or similar device 16, which is contained within an internally reflective enclosure 17 together with the gaseous discharge device 10, is disposed so as to be outside the area of maximum intensity of magnetic field strength. This is usually desirable and particularly so where element 16 is a laser and it is desireable not to disturb the normal, predictable operation of the laser by causing it to be exposed to too high an intensity of magnetic field.

It is to be understood, of course, as will be readily apparent to those skilled and knowledgeable in the art, that the particular configuration illustrated in FIGS. 1 and 2 is only one of many possible forms of the present invention and that the concept and teaching disclosed herein may be widely and variously employed as desired to effect desirable results.

OPERATION

In a typical operation of the embodiment illustrated in FIGS. 1 and 2 the gaseous discharge device 10 may be, for example, a nitrogen gas lamp energized by a source of electrical energy 15 which is pulsed DC in nature. The coils of conductive material 12 and 13 may be energized by an independent source of electrical energy 14 which is direct current in nature. Accordingly, the electric field created by the flow of electrical current through the gaseous discharge device 10 is in the same direction as the current flow. The magnetic field, however, which traverses the airgap of the ferromagnetic element 11 is unidirectional and perpendicular to the electric field.

When the gaseous discharge device 10 is energized by the source of direct current electrical energy 15 in the absence of an electric field, the nitrogen gas will emit radiant energy having a spectral character generally of that shown by the solid line characteristic illustrated in FIG. 3, depicting intensity of radiation versus Angstrom units. It will be seen that a major peak of radiant energy output occurs at approximately 4,340 A., with a relatively minor peak of radiant energy output in the vicinity of 4,415 A. It has been found that substantially the same spectral character of radiant energy output will be realized in the absence of any magnetic field as in the presence of a weak residual magnetic field such as may remain in an electromagnetic configuration of the type illustrated in FIGS. 1 and 2 after the source of electrical energy to the coils has been disconnected. The residual electric field in one such typical embodiment was found to be of the order of 600 gauss.

Upon energizing the coils 12 and 13, the intensity of the magnetic field traversing the airgap of the ferromagnetic element 11 is raised to approximately 20,000 gauss, affecting a dramatic change in the output of peak radiant energy emitted from the same nitrogen gas lamp whose normal characteristic is illustrated by the solid line graphical illustration in FIG. 3. As shown in FIG. 3 by the dashline characteristic, peak energy outputs of radiant energy from the gaseous discharge device in the form of a nitrogen flash lamp are caused to occur at approximately 4,344 A., 4,433 A., and 4,447 A., the principal peak energy output occurring at the latter frequency.

Thus, it may be seen that where a dye liquid, for example, may require energy in an absorption band at or near 4,447–48 A., a nitrogen gas lamp energized by an appropriate pulsed DC source of electrical energy and positioned in a magnetic field of the order of 20,000 gauss can be caused to emit peak energy in the required spectral band. Those skilled and knowledgeable in the art will appreciate that the example given of a nitrogen gas lamp will operate without a magnetic field or with a negligible residual field to produce spectral emission typical of the nitrogen molecule. With a magnetic field, however, the molecular bands are radically changed to a degree where they virtually disappear and the spectral emission of ionized atomic nitrogen becomes prominent, the latter spectral emission arising from a much more highly energized discharge. One interpretation of this effect may be that with a magnetic field, more energy can be fed into the gas with a resultant increase in the electron temperature i.e., the average electron energy which can excite the molecule to a higher energy state, disassociating the molecule, ionizing the atom, and also exciting the ion. Thus, the present invention conceives and teaches the control of radiation from a gaseous discharge device in a convenient, efficient and readily practicable manner.

It should also be appreciated that the gaseous discharge device 10 may be a laser device itself so that the concept and teaching of the present invention is equally as readily applicable to altering the emission characteristics of a laser directly, as well as altering the emission characteristics of a device used as an excitation source for a laser which in turn is positioned proximate to the gaseous discharge device.

Moreover, it has been found that, within the teaching and concept of the present invention, it is possible to change the magnetic field strength and intensity in several degrees, achieving several different distinctive spectral emission characteristics, each of which differs from the other as a result of different intensities of magnetic fields applied to the gaseous discharge device.

The magnetic field, as employed in the present invention may be provided by an appropriate permanent magnet, an electromagnet or other suitable arrangement consistent with the inherent requisites for the practice of the invention.

Obviously many modifications and variations of the present invention are possible in the light of the above teachings. It is therefore to be understood that within the scope of the appended claims the invention may be practiced otherwise than as specifically described.

What is claimed is:

1. Means for generating radiant energy having controllably different spectral emissions comprising:
    a gaseous discharge device including a gas enclosed within an envelope;
    a source of electrical energy connected to said gaseous discharge device for producing a flow of current therethrough generating the emission of radiant energy of a determinable spectral character;
    a magnetic field source for generating a magnetic field; and
    means for positioning said magnetic field source relative to said gaseous discharge device for causing the magnetic field to perpendicularly intercept the electric field resultant from said flow of current, the intensities of said magnetic field source and said electrical energy being of such amplitudes as to raise said gaseous discharge device to a higher state of ionization for producing spectral emission which is characteristic of said higher state of ionization.

2. Means for generating radiant energy as claimed in claim 1 wherein said gaseous discharge device is capable of emitting laser energy.

3. Means for generating radiant energy as claimed in claim 1 wherein said source of electrical energy is pulsed direct current.

4. Means for generating radiant energy as claimed in claim 1 wherein said magnetic field source is a permanent magnet.

5. Means for generating radiant energy as claimed in claim 1 wherein said magnetic field source is an electromagnet.

6. Means for generating radiant energy as claimed in claim 5 wherein said electromagnet is controlled by a variable source of electrical energy, whereby to selectively change the spectral character of the emitted energy to one of several spectral regions each of which is characteristic of a different state of ionization.

7. Means for generating radiant energy as claimed in claim 1 and including a laser material optically coupled with said gaseous discharge device for pumping of said laser material.

8. Means for generating radiant energy as claimed in claim 7 wherein said laser material is highly absorptive of energy of the spectral character of the radiant energy emitted at said higher state of ionization.

9. Means for generating radiant energy as claimed in claim 7 wherein said laser material is positioned with its principal axis parallel to the principal axis of the gaseous discharge device and substantially coextensive therewith.

10. Means for generating radiant energy as claimed in claim 8 wherein said laser material is positioned to be subjected to the minimum strength of magnetic field.

11. Means for generating radiant energy as claimed in claim 9 wherein said laser material and said gaseous discharge device are contained within a common internally reflective laser pump enclosure.